United States Patent [19]
Aigner

[11] Patent Number: 5,423,359
[45] Date of Patent: Jun. 13, 1995

[54] PROTECTIVE HOOD FOR WOOD CUTTING MACHINES

[76] Inventor: Georg Aigner, Thannenmais, Reisbach 94419, Germany

[21] Appl. No.: 182,054

[22] PCT Filed: May 12, 1993

[86] PCT No.: PCT/EP93/01166
§ 371 Date: Jan. 14, 1994
§ 102(e) Date: Jan. 14, 1994

[87] PCT Pub. No.: WO93/23199
PCT Pub. Date: Nov. 25, 1993

[30] Foreign Application Priority Data
May 16, 1992 [DE] Germany .......................... 42 16 338.2

[51] Int. Cl.6 .............................................. B27G 21/00
[52] U.S. Cl. .................................... 144/252 R; 15/301; 144/251 A; 83/100; 409/134; 409/137
[58] Field of Search .................... 15/301; 51/268, 273; 83/100; 144/134 R, 134 A, 251 R, 251 A, 252 R, 252 A; 409/134, 137, 226, 228, 229

[56] References Cited

U.S. PATENT DOCUMENTS

| | | |
|---|---|---|
| 2,008,391 | 7/1935 | Hartzell et al. |
| 3,786,846 | 1/1974 | Mehring .......................... 144/251 R |
| 4,484,845 | 11/1984 | Pennello, Jr. .................... 144/251 A |
| 4,821,365 | 4/1989 | Chanters ........................ 144/252 R |

Primary Examiner—W. Donald Bray
Attorney, Agent, or Firm—Cohen, Pontani, Lieberman, Pavane

[57] ABSTRACT

A protective hood for wood cutting machines covers a cutting tool which is fastened to a spindle, projects vertically from a machine table, and is situated under the protective hood which is arranged on the machine table. The protective hood has two side walls which are connected with one another by a rear wall, a cover, and a vertically adjustable front protective shield which can be clamped at the front edge of the cover by locking screws. At least the lower edge of the protective shield, preferably the entire protective shield, can be adjusted upward vertically against the force of pressure springs. The protective shield is supported so as to be displaceable in two guide strips which are fastened at the front edge of the cover of the protective hood. The protective shield which is constructed in this way always exerts a contact pressure on the workpiece with its lower edge.

11 Claims, 4 Drawing Sheets

PROTECTIVE HOOD FOR WOOD CUTTING MACHINES

BACKGROUND OF THE INVENTION

The invention is directed to a protective hood for wood cutting machines for covering a cutting tool which is fastened to a spindle, projects vertically from a machine table, and is situated under the protective hood. The protective hood is arranged on the machine table and has two side walls connected with one another by a rear wall, a cover, and a vertically adjustable front protective shield.

The subject matter of DE-OS 39 31 141 is a chip catching device for a table-mounted cutting machine for cutting curved wooden workpieces. This chip catching device has a protective hood of the constructional type outlined above with a transparent protective shield which can be adjusted vertically so as to adapt to the feed gap for the workpieces with respect to height.

SUMMARY OF THE INVENTION

The present invention has the object of providing a protective hood for wood cutting machines in which the protective shield only allows a gap with the height absolutely necessary for the workpiece and which, at the same time, guides this workpiece in such a way that the cutting process can be carried out as safely as possible.

This object is met according to the invention in a protective hood of the generic type mentioned above in that the lower edge of the protective shield can be adjusted vertically upward against spring force.

This solution has the considerable advantage that the spring force exerts a contact pressure on the workpiece so that this workpiece is pressed against the machine table from above and is always guided reliably during cutting.

In a further development of the invention, the underside of the lower edge of the protective shield slopes upward diagonally relative to the horizontal machine table proceeding from one side of the center region. In this way, a feed gap is created which allows the workpiece to be fed to the cutting tool easily. For this purpose, the underside of the lower edge advantageously extends parallel to the machine table in its center region and slopes upward obliquely toward both sides.

In a preferred embodiment of the invention, the lower edge of the protective shield is rigidly connected with the protective shield which is displaceable vertically upward against spring force in two guide members fastened to the protective hood.

Additional features and advantages of the invention are indicated in the patent claims and in the following description of an embodiment example shown in the drawing.

DETAILED DESCRIPTION OF THE PREFERRED EMBODIMENTS

Figure 1:
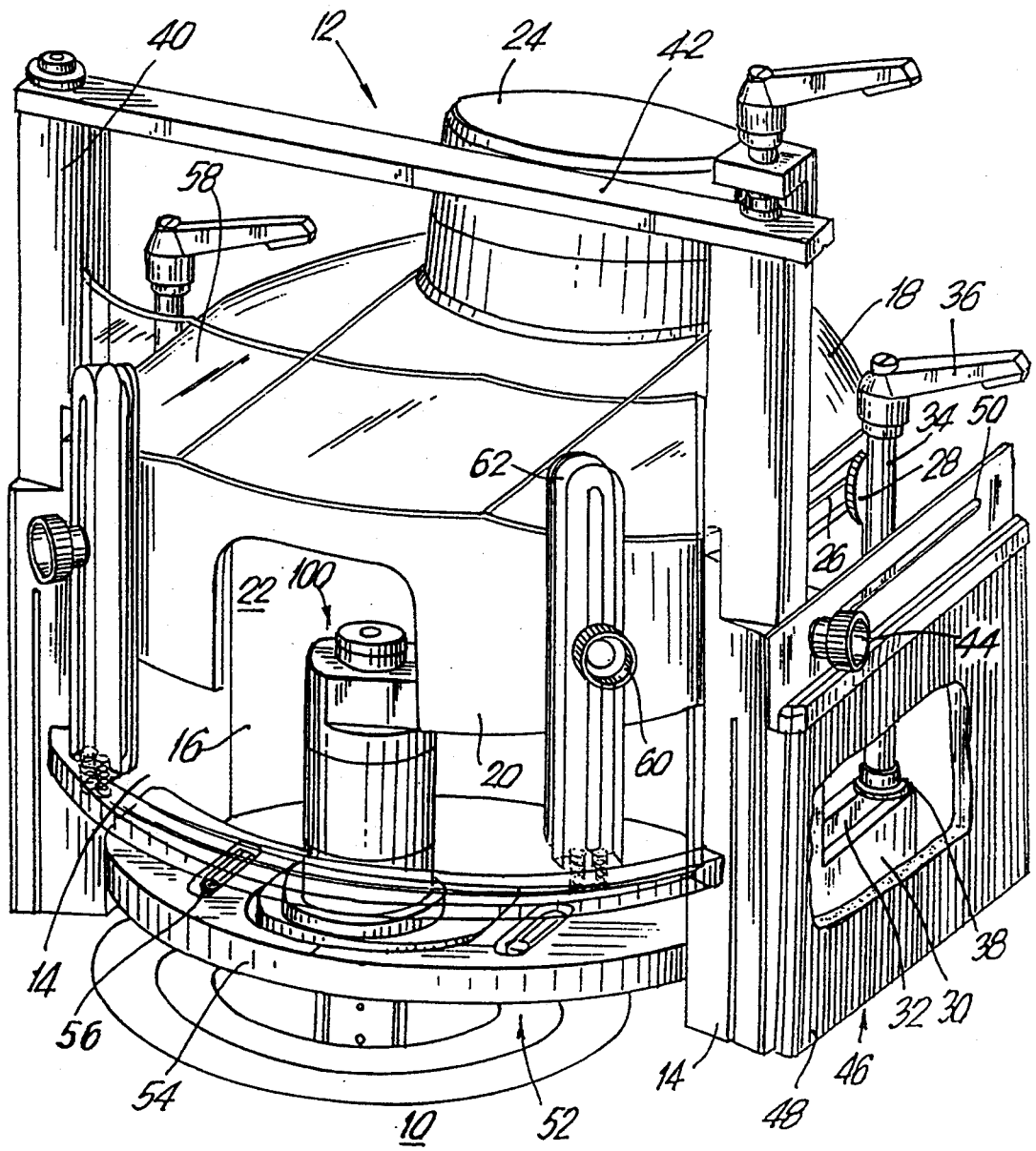
FIG. 1 shows an oblique view of a protective hood, according to the invention, which is arranged at a wood cutting machine.

FIG. 1 shows a horizontal machine table 10 of a wood cutting machine on which is secured a protective hood 12 which covers the work area of a cutting tool 100 which is attached to a spindle. The protective hood 12 includes two side walls 14, a rear wall 16 connecting the latter, and a cover 18 which is rigidly connected with the rear wall 16. An edge 20 projects downward from the cover 18 at the front and sides and has in its front region a cut out portion 22 which opens downward and provides a larger view into the interior of the protective hood 12. The cover 18 has a connection piece 24 in its rear area for connecting a suction device.

The two side walls 14 are displaceable in the horizontal direction independently from one another. For this purpose, each side wall 14 has an upper, horizontally extending longitudinal slot 26 through which is inserted a knurled screw 28 which is screwed into a threaded bore hole, not shown, at the downwardly projecting edge 20 of the cover 18. By loosening the knurled screw 28, the corresponding side wall 14 at the protective hood 12 can be adjusted toward the front or toward the rear.

Each side wall 14 has in its lower area an outwardly projecting step 30 in which a vertical longitudinal slot 32 is incorporated. The threaded end of a screw 34 which carries a clamping lever 36 at its upper end is inserted through this longitudinal slot 32. The clamping lever 36 is situated above the cover 18. The screw 34 has a collar 38 in its center area which is supported on top of the step 30. The threaded end of the screw 34 is screwed into a threaded bore hole of the machine table 10 so that the protective hood 12 can be fixed thereon by means of the screws 34.

A supporting column 40 is attached to the forward-facing end of each side wall 14. The two supporting columns 40 are connected with one another by a cross piece 42, these cross pieces 42 serving to fasten pressing members and guiding members which are not shown in the drawing.

A dust protection curtain 46 having downwardly directed bristles 48 is fastened to the right side wall 14, with reference to FIG. 1, of the protective hood 12 by means of a clamping screw 44. The clamping screw 44 projects through a horizontal longitudinal slot 50 of the dust protection curtain 46 so that the latter is adjustable in the horizontal direction.

In the application of the protective hood 12 shown in FIG. 1, a guide member 52 for the workpiece to be cut is arranged on the spindle, not shown. In the embodiment shown in the drawing, the guide member 52 has a curve cutting stop 54 which can be fixed in position by means of two hexagon socket screws 56.

The front opening of the protective hood 12 is covered by a vertically movable transparent protective shield 58. The curved protective shield 58 can be fixed in any desired vertical position by means of two locking screws 60 at the front downwardly projecting edge 20 of the cover 18.

Two vertically aligned guide strips 62, each of which engages in a vertical slot 64 incorporated in the side of the protective shield 58, serve to fasten the protective shield 58 at the edge 20 of the cover 14. Each vertical slot 64 engages with its two longitudinal edges in two longitudinal slots 66 at the opposite longitudinal edges of the guide strip 62. This type of support allows the protective shield 12 to move in the vertical direction relative to its two guide strips 62.

Figure 4:
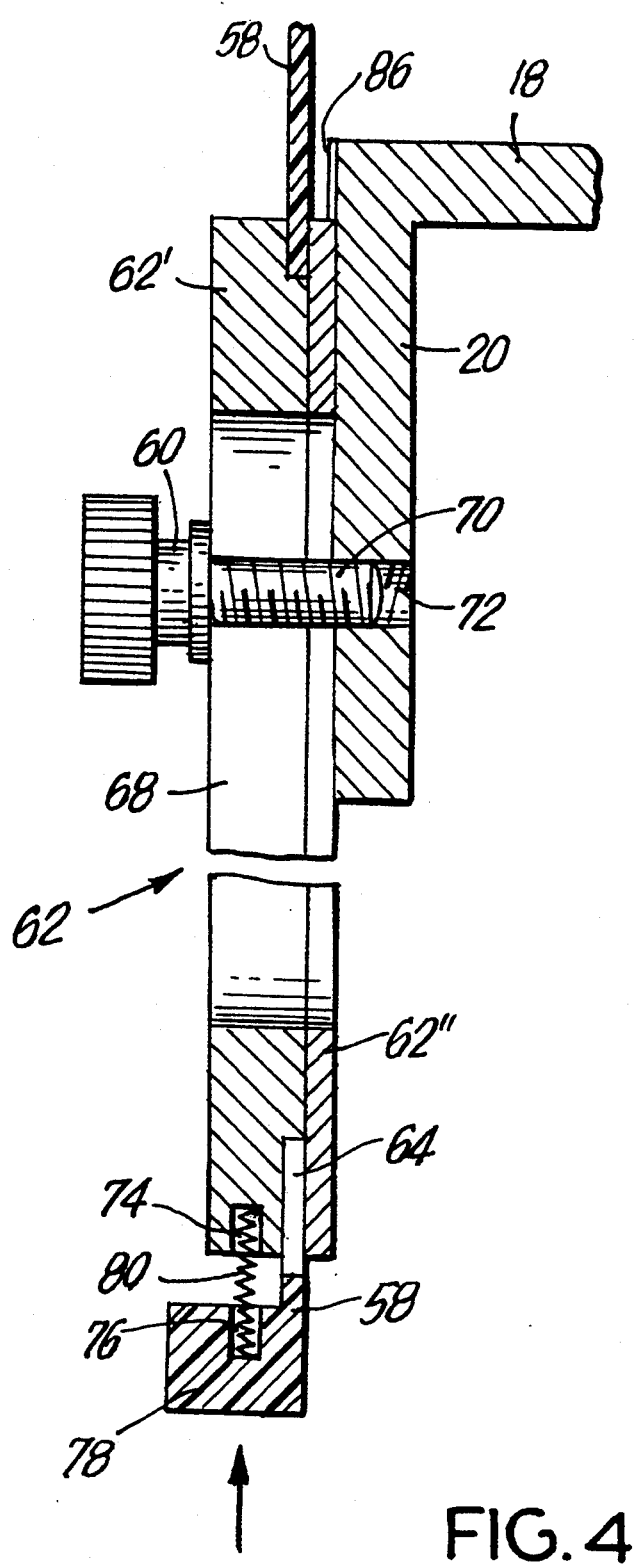
FIG. 4 shows a vertical section through the protective shield in the region of a guide strip.

As shown in FIG. 4, each guide strip 62 is constructed in two parts and has a front part 62' and a rear part 62" which are screwed or glued together. Assembly is effected by first inserting the front part 62' into the vertical slot 64 of the protective shield 58, whereupon the rear part 62' is securely connected with the front part 62'.

Each guide strip 62 has an elongated hole 68 whose longitudinal axis coincides with that of the vertical slot 64 of the protective shield 58. The threaded shank 70 of the locking screw 60 extends through the elongated hole 68 and is screwed by its end into a threaded bore hole 72 of the front edge 20 of the cover 18. When the locking screw 60 is loosened, the protective shield 58 can be adjusted in height and then clamped again to the front edge 20 of the cover 18. The guide strips 62 engage in vertical guide grooves 86 incorporated into the front side of the edge 20 of the cover 18 so as to ensure a vertical adjustment of the two guide strips 62 without tilting.

Two pocket holes 74 are incorporated into the lower end of each guide strip 62. These pocket holes 74 correspond to two opposite pocket holes 76 which are incorporated in the projecting lower edge 78 of the protective shield 58. A pressure spring 80 is inserted in two aligned pocket holes 74 and 76 in each instance. The total of four pressure springs 80 of the embodiment shown in the drawing press the protective shield 58 downward until the two upper ends of the vertical slot 64 are supported at the upper connecting surface of the two lateral longitudinal slots 66 of each guide strip 64.

Figure 2:
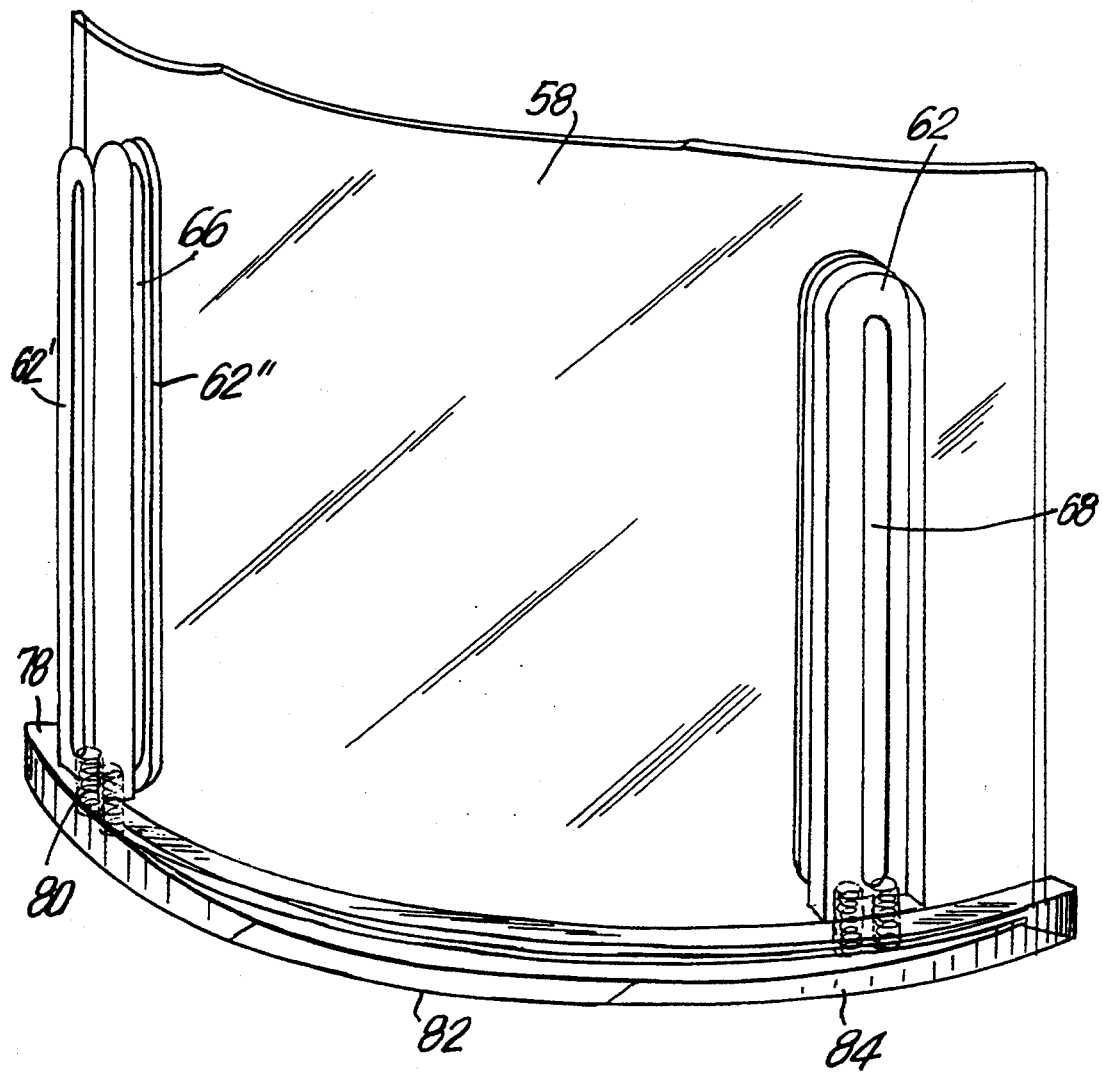
FIG. 2 is a view of the protective shield.
Figure 3:
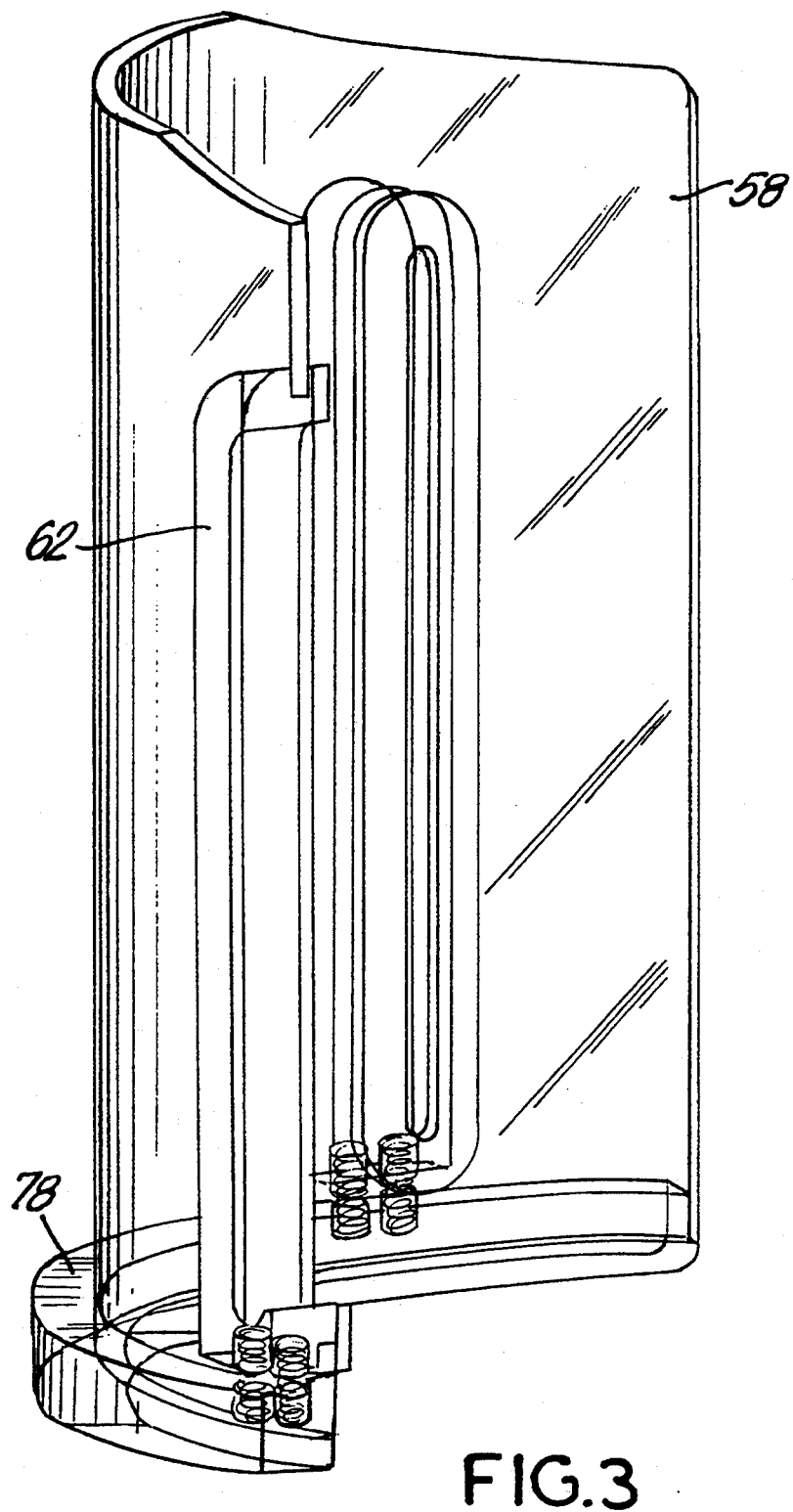
FIG. 3 shows a partial section of the protective shield.

FIG. 2 shows that the underside of the lower edge 78 has a center region 82 which is parallel to the machine table 10. The underside of the lower edge 78 slopes upward diagonally toward both sides proceeding from this center region 82 so as to form slanted guide surfaces 84 which facilitate the insertion of a workpiece.

In order to cut a workpiece, the protective shield 58 is pushed down as far as possible and clamped at the front edge 20 of the cover 18 by means of the two locking screws 60. The distance of the underside of the center area 82 from the machine table 10 should be somewhat less than the height of the workpiece. When feeding in a workpiece for cutting, its front end presses on the corresponding oblique guide surface 84 at the lower edge 78 of the protective shield 58 and presses the latter upward against the force of the pressure springs 80 in the direction of the arrow shown in FIG. 4. In this way, the protective shield 58 exerts a contact pressure force on the workpiece so that it is always held reliably while cutting.

I claim:

1. A protective hood for wood cutting machines for covering a cutting tool which is fastened to a spindle, projects vertically from a horizontal machine table and is situated under the protective hood which is arranged on the machine table, the protective hood comprising: two side walls; a rear wall that connects the side walls together; a cover; a vertically adjustable front protective shield that has a lower edge that is upwardly adjustable vertically against a spring force; and spring means for providing the spring force against upward movement of the lower edge of the protective shield.

2. A protective hood according to claim 1, wherein said lower edge has an underside that slopes diagonally upward relative to the horizontal machine table from at least one side of a central region of the underside of the lower edge.

3. A protective hood according to claim 2, wherein the underside of the lower edge extends parallel to the machine table in its center region and slopes upward diagonally toward both sides.

4. A protective hood according to claim 1, and further comprising two guide members fastened to the cover, the protective shield being displaceably supported in the two guide members fastened to the cover, and the lower edge being rigidly connected with the protective shield.

5. A protective hood according to claim 4, wherein vertical slots are provided in the protective shield each of the guide members having a vertically aligned guide strip which engages in one of the vertical slots in the protective shield.

6. A protective hood according to claim 5, wherein each guide strip has a longitudinal slot, the vertical slots in the protective shield each having two longitudinal edges that engage in each instance in one of the longitudinal slots of the guide strips, the longitudinal slots being provided in an opposing longitudinal edge of the guide strip.

7. A protective hood according to claim 5, wherein each guide member has an elongated hole, and further comprising two locking screws, each one of said locking screws passing through one of said elongated holes and being engageable with the cover so as to clamp the guide member to the cover.

8. A protective hood according to claim 5, wherein said spring means includes a pressure spring arranged between a lower end of a guide strip and the opposing lower edge of the protective shield.

9. A protective hood according to claim 1, wherein the sidewalls are horizontally displaceable independently from one another.

10. A protective hood according to claim 9, and further comprising means for adjusting the position of the sidewalls.

11. A protective hood according to claim 1, and further comprising a dust protection curtain fastened to at least one of the sidewalls, the dust protection curtain having a plurality of downwardly directed bristles.

* * * * *